(12) United States Patent
Rief et al.

(10) Patent No.: US 6,706,175 B1
(45) Date of Patent: Mar. 16, 2004

(54) DEBRIS-CAPTURING APPARATUS FOR PRESSURE CLEANERS

(76) Inventors: Dieter J. Rief, 2780 Brady Rd., Santa Rosa, CA (US) 95404; Rosemarie Rief, 2780 Brady Rd., Santa Rosa, CA (US) 95404; Manuela Rief, 2780 Brady Rd., Santa Rosa, CA (US) 95404

( * ) Notice: Subject to any disclaimer, the term of this patent is extended or adjusted under 35 U.S.C. 154(b) by 0 days.

(21) Appl. No.: 10/279,520

(22) Filed: Oct. 24, 2002

(51) Int. Cl.⁷ .............................. E04H 4/16; B01D 29/27
(52) U.S. Cl. ................... 210/169; 210/416.2; 210/448; 15/1.7
(58) Field of Search ................. 210/169, 232, 210/416.1, 416.2, 448; 15/1.7

(56) References Cited

U.S. PATENT DOCUMENTS

| | | | |
|---|---|---|---|
| 2,039,741 A | * 5/1936 | Richards | 55/366 |
| D279,227 S | 6/1985 | Price | |
| 4,575,423 A | 3/1986 | Alanis | |
| 4,618,420 A | 10/1986 | Alanis | |
| D288,373 S | 2/1987 | Alanis | |
| D294,963 S | 3/1988 | Alanis et al. | |
| 4,856,913 A | 8/1989 | Campbell | |
| 4,880,531 A | * 11/1989 | Blake et al. | 210/169 |
| D310,774 S | 9/1990 | Collins et al. | |
| D311,796 S | 10/1990 | Collins | |
| D379,693 S | 6/1997 | Campbell | |
| 5,863,425 A | * 1/1999 | Herlehy et al. | 210/169 |
| D421,512 S | 3/2000 | Campbell | |
| 6,193,885 B1 | 2/2001 | Campbell | |
| 6,241,899 B1 | * 6/2001 | Ramos | 210/767 |

FOREIGN PATENT DOCUMENTS

WO   WO 01/92663   12/2001

* cited by examiner

Primary Examiner—Fred G. Prince
(74) Attorney, Agent, or Firm—Jansson, Shupe & Munger, Ltd.

(57) ABSTRACT

An debris-capturing apparatus having a fluid-pervious wall, an attachment portion attachable to the outflow port of a pressure-cleaner device, and a collapsible inflow tube that is substantially opened and made erect by the inflow of fluid but otherwise axially collapsed and thereby closed so as to block reverse flow of debris through the outflow port. The erected inflow tube preferably has cross-sectional flow areas along its entire length approximating the cross-sectional flow area of the outflow port. The debris-capturing apparatus is preferably integrally formed such that the inflow tube is a turned-in extension of the attachment portion.

20 Claims, 4 Drawing Sheets

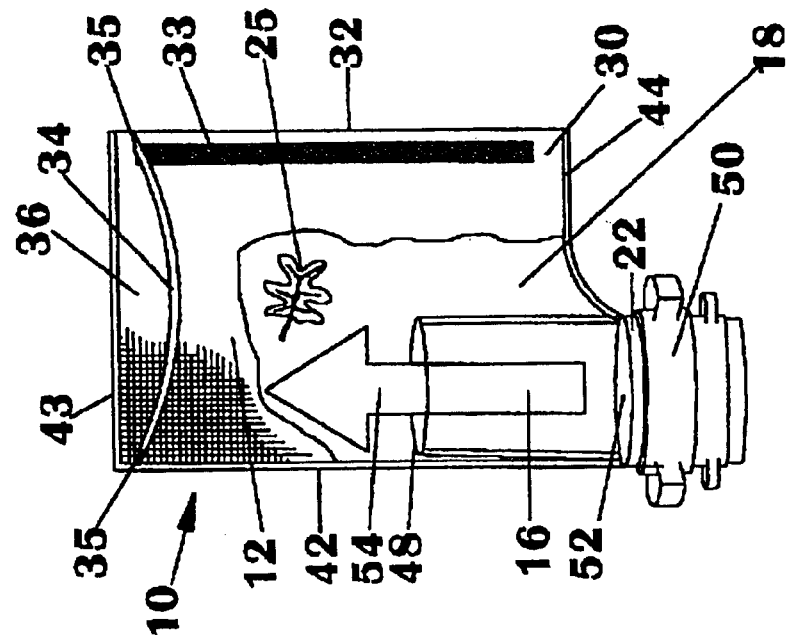
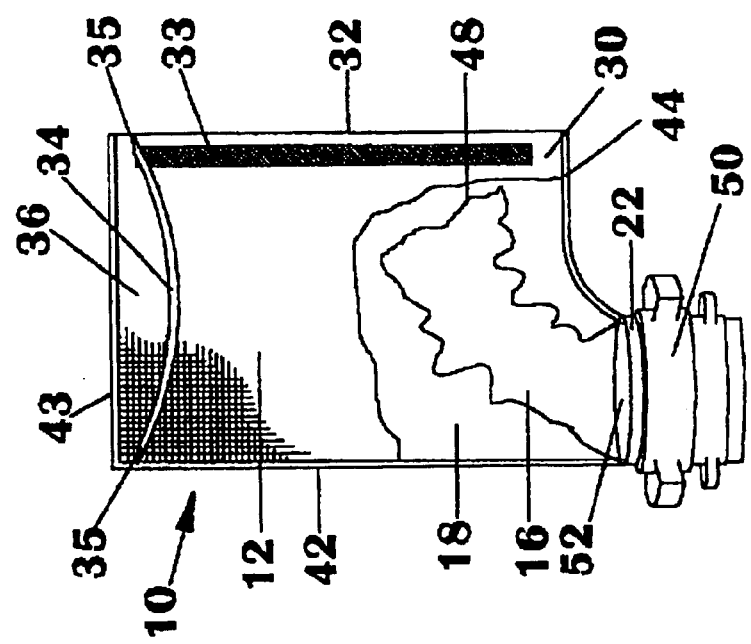
FIG. 4
FIG. 5

DEBRIS-CAPTURING APPARATUS FOR PRESSURE CLEANERS

FIELD OF THE INVENTION

The present invention relates to swimming pool cleaners and, more particularly, to automatic cleaners that move along the underwater surface of a swimming pool. Still more specifically, the invention relates to devices designed to collect and capture the debris dislodged during the sweep of a pool through the operation of such cleaners.

BACKGROUND OF THE INVENTION

Automatic swimming pool cleaners of the type that move or sweep along the underwater surface of a residential or commercial swimming pool have become popular for dislodging and collecting debris and sediment from the floor of the pool. Cleaning devices of this type include several where a flow of water under pressure is harnessed to provide not only power for the forward motion of the cleaner but also the means by which the debris is drawn through hydraulic suction into some manner of debris-capturing apparatus. See, for example, the turbine-driven automatic swimming pool pressure cleaner shown and described in commonly-owned PCT International Publication No. WO 01/92663, entitled "Swimming Pool Pressure Cleaner with Internal Steering Mechanism," of Poolvergnuegen of Santa Rosa, Calif. Typically, the pressurized water supply for such automatic pool cleaners is provided by a remote pump.

A typical debris-capturing apparatus for such devices is referred to as a pressure-cleaner bag. Such bags are made from a flexible porous fabric that allows water drawn upward from the floor of the pool into the bag to pass through it, thus trapping any and all debris entering the bag with the water. Moreover, each of these bags has an attachment portion that forms an opening into the bag and provides sleeved attachment to an outflow port of the pool cleaner.

In many pressure-cleaner bags, however, debris will tend to collect inside the bag in the area of the attachment to the outflow port. This poses a number of problems to the effective operation of the cleaner. The accumulation of debris near the mouth of the outflow port creates an obstruction to the free flow of water through the port. It also allows the debris to re-enter the swimming pool by falling back through the outflow port when the cleaner is turned off. In addition, some spillage of debris is inevitable when the bag is removed from the cleaner due to the absence of any means of closing off the opening into the bag.

While some improvements have been made in the past in pressure-cleaner bags to address certain of these concerns, past efforts have involved certain other disadvantages. For example, certain prior devices have involved complex design that may add expense in the manufacture of pressure-cleaner bags, limit the ability to reuse them efficiently over time, and even somewhat restrict or limit the inflow of water and debris. One such prior device is disclosed in U.S. Pat. No. 4,856,913 (Campbell).

This invention addresses such problems and shortcomings.

OBJECTS OF THE INVENTION

It is a primary object of this invention to provide an improved debris-capturing apparatus overcoming some of the problems and shortcomings of the prior art, including those mentioned above.

Another object of this invention is to provide an improved swimming pool pressure-cleaner bag which stops return flow of debris and yet is simple to manufacture and highly reliable in operation.

Another object is to provide an improved swimming pool pressure-cleaner bag which stops return flow of debris and yet allows substantially unrestricted inflow of water and debris.

Another object is to provide an improved swimming pool pressure-cleaner bag which stops return flow of debris and operates reliably over an extended period of time.

Still another object of the invention is to provide an improved swimming pool pressure-cleaner bag that is easy and inexpensive to manufacture, easy to ship and store, and easy to install and maintain.

These and other objects of the invention will be apparent from the following descriptions and from the drawings.

SUMMARY OF THE INVENTION

This invention is an improvement in a debris-capturing apparatus of the type including (a) a fluid-pervious wall forming a cavity, (b) an attachment portion forming an opening into the cavity and having an annular lowermost edge where it is attached to the outflow port of a pressure-cleaner device, and (c) an inflow tube inside the cavity that is substantially opened by the inflow of fluid from the outflow port but is otherwise closed to block reverse flow of debris through that port.

In the improvement of this invention, the inflow tube has an annular proximal edge secured to the attachment portion at its lowermost edge and the tube is made of a material whereby it is substantially erect along the flow axis defined by the inflow of fluid but is otherwise collapsed axially so as-to block any reverse flow of debris out of the cavity. When the pressure-cleaner device is operating with the apparatus attached, the pressure from the flow of fluid entering the attachment portion expands the inflow tube so that it achieves an erect configuration, allowing the fluid to enter the cavity. When the pressure cleaner is not operational, the absence of pressure from an inflow of fluid causes the tube to collapse on itself. With collapse, the inflow tube folds over onto itself to form a flaccid mound of material in a random fashion covering the opening to the outflow port and thereby blocking any flow of debris out of the cavity into the pressure-cleaner. This collapse, because it is along the axis of what was the erect inflow tube and is generally in the direction of the proximal edge of such tube, can be described as "axial collapse."

In the debris-capturing apparatus of the present invention, the erected inflow tube has preferably cross-sectional flow areas along its entire length approximating the cross-sectional flow area of the outflow port of the pressure-cleaner device, although other shapes are possible. This preferred embodiment minimizes any outflow restriction through the inflow tube.

In a highly preferred embodiment of the present invention, the inflow tube is made of a fluid-pervious material. Most preferably, the inflow tube is integrally formed with the attachment portion. The term "integrally formed" means that adjacent portions of the apparatus (bag) are formed together, i.e. without any seam or other formed juncture where they meet. In a more specific embodiment, the fluid-pervious wall, the attachment portion and the inflow tube are all integrally formed and constitute a pressure-cleaner bag. This allows the inflow tube to be a turned-in extension of the attachment portion.

In certain preferred embodiments of the present invention, the pressure-cleaner device is a swimming pool pressure cleaner. In such embodiments, it is highly preferred that the fluid-pervious wall, the attachment portion and the inflow tube constitute a pressure-cleaner bag formed from a unitary piece. The term "unitary piece" refers to portions which are integrally formed.

Another highly preferred embodiment has a band attached at its opposite ends to the top portion of the fluid-pervious wall. This band secures the debris-capturing apparatus with respect to a pressure hose attached to the pressure-cleaner device to allow the fluid-pervious wall to remain substantially upright. While cords and belts of various shapes and materials are possible, a most highly preferred choice for the band is a length of rope.

In another alternative embodiment, the invention is an improved swimming pool pressure-cleaner bag comprising (a) a fluid-pervious wall forming a cavity, (b) an attachment portion forming an inflow opening and having an annular lower edge, and (c) an erectible-collapsible inflow tube portion inside the cavity. The inflow tube portion includes an annular proximal edge secured to the attachment portion at and around the annular lower edge and a distal end free to move within the cavity. The inflow tube portion also is made from a material chosen so that it remains substantially erect along a flow axis when fluid is entering the bag but otherwise collapses axially to block any reverse flow and thereby capture and collect debris.

In such an embodiment, it is preferred that the pressure-cleaner bag be a unitary piece, the inflow tube portion being a turned-in extension of the attachment portion. Most preferably, the erected inflow tube portion has a cross-sectional flow area along its entire length approximating the cross-sectional flow area of the outflow port of the pressure-cleaner device to which the bag is attached. It is also highly preferred that the bag include a band that has its opposite ends attached to the top portion of the fluid-pervious wall so that the fluid-pervious wall can remain substantially upright by securing itself, by means of the band, to the pressure hose attached to the inflow port of the pressure-cleaner device.

BRIEF DESCRIPTION OF THE DRAWINGS

FIG. 4 is a side constructional view of the swimming pool pressure-cleaner bag of the present invention including a partial cut-out showing the inflow tube in a status of collapse prior to the swimming pool pressure cleaner being operational;

FIG. 5 is a side constructional view of the swimming pool pressure-cleaner bag of FIG. 4 including a partial cut-out showing the status of the inflow tube when fluid pressure is present at the outflow port after the swimming pool pressure cleaner is operational;

DETAILED DESCRIPTION OF PREFERRED EMBODIMENTS

Figure 1:
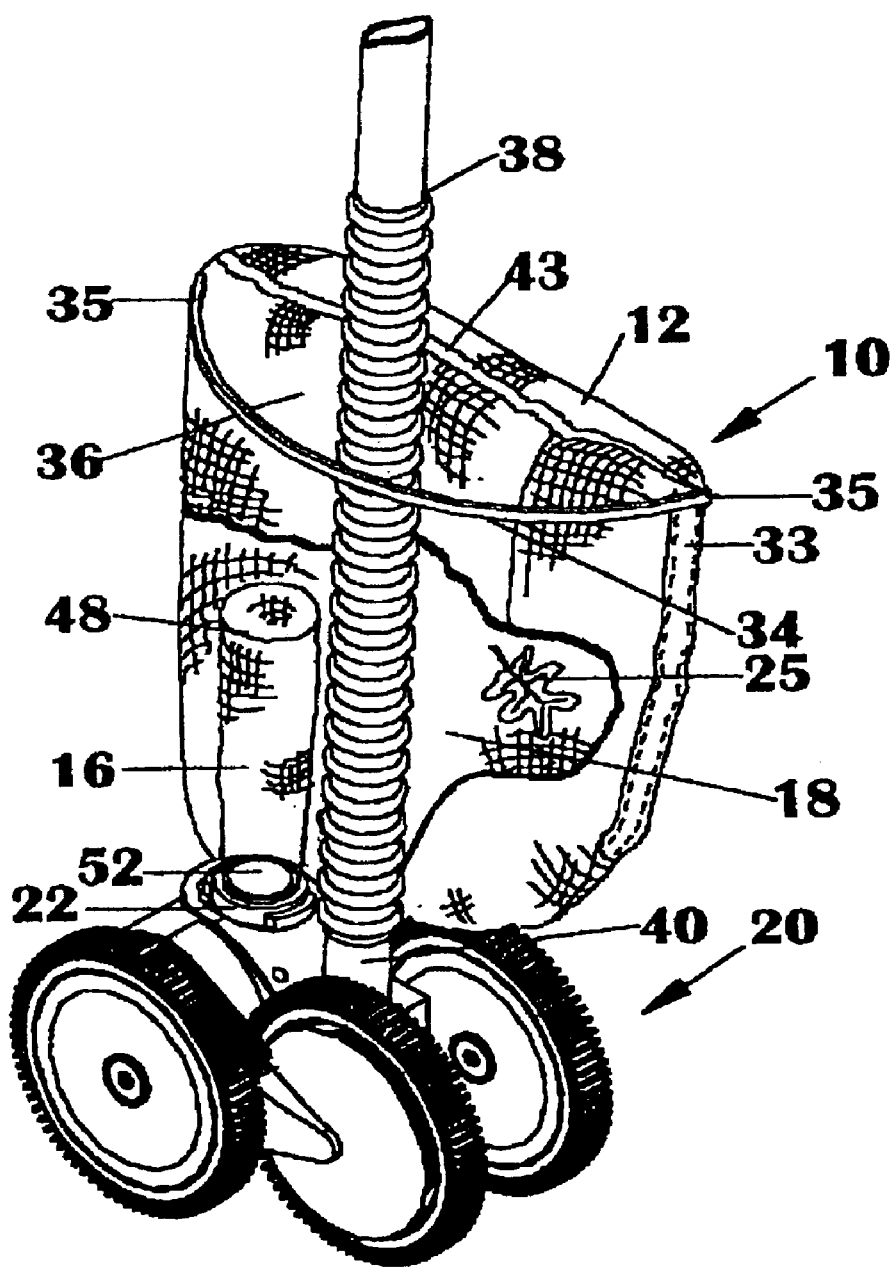
FIG. 1 is a perspective view of an improved swimming pool pressure-cleaner bag of the present invention mounted on a swimming pool pressure cleaner including a partial cut-out showing internal bag components.

FIG. 1 illustrates an improved swimming pool pressure-cleaner bag 10 having a fluid-pervious wall 12, an attachment portion 14, and a collapsible inflow tube 16. The wall 12 forms a cavity 18 that accommodates the inflow tube 16. The bag 10 is shown removably attached to a swimming pool pressure cleaner 20 at an outflow port 22 by means of the attachment portion 14. During operation of the swimming pool pressure cleaner 20 with the bag 10 so attached, a flow of fluid, usually water, is received by the bag 10 through an inflow opening 24 located at the lowermost edge 26 of the attachment portion 14. The water carries debris 25 such as leaves and twigs that is drawn from the surface being cleaned.

The wall 12, attachment portion 14 and inflow tube 16 are each made from a flexible, open-mesh material such as nylon that allows water to pass through it but not any of the debris. The size of the mesh chosen will be based on the size of the debris particle sought to be collected.

Figure 2:
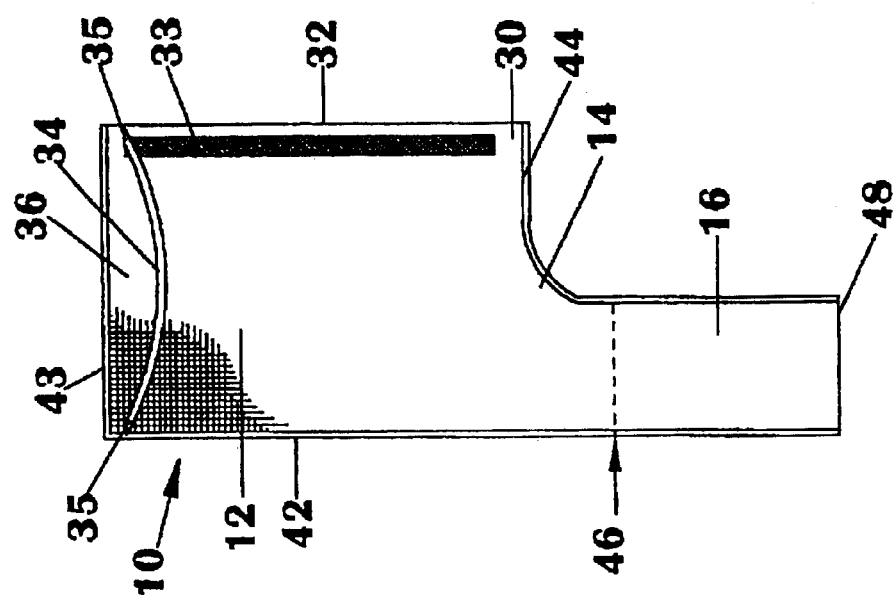
FIG. 2 is a side view of the swimming pool pressure-cleaner bag in FIG. 1 including a partial cut-out showing internal bag components.

As illustrated in FIG. 2, the inflow tube 16 has an annular proximal edge 28 that is secured to the attachment portion 14 at and around the lowermost edge 26. The first side edge 30 of the wall 12 forms a discharge opening 32 that is held closed by velcro-type fastener strips 33 sewn onto the wall 12 along the first side edge 30. The fastener strips 33 can be easily opened after operation of the swimming pool pressure cleaner 20 to empty debris from the bag 10 without disengaging it from the pressure cleaner 20. After removing the debris, the discharge opening can be quickly closed again by re-engaging the fastener strips 33 in preparation for later debris collection.

As seen in FIG. 1, the bag 10 is also provided with a band 34 attached at its opposite ends 35 to the top portion 36 of the wall 12. A pressure hose 38 that attaches to the inflow port 40 of the swimming pool pressure cleaner 20 is passed between the band 34 and the wall 12 so that the wall 12 remains substantially upright during operation of the swimming pool pressure cleaner 20. While the choices in material with which to construct the band 34 will be apparent to those of ordinary skill in the art, a preferred selection is a length of rope. The band 34, by keeping the wall 12 of the bag 10 substantially erect, prevents the bag 10 from shifting to one side of the swimming pool pressure cleaner 20 or the other as the cavity 18 fills with debris and thereby interfere with efficient operation of the pressure cleaner 20.

Figure 3:
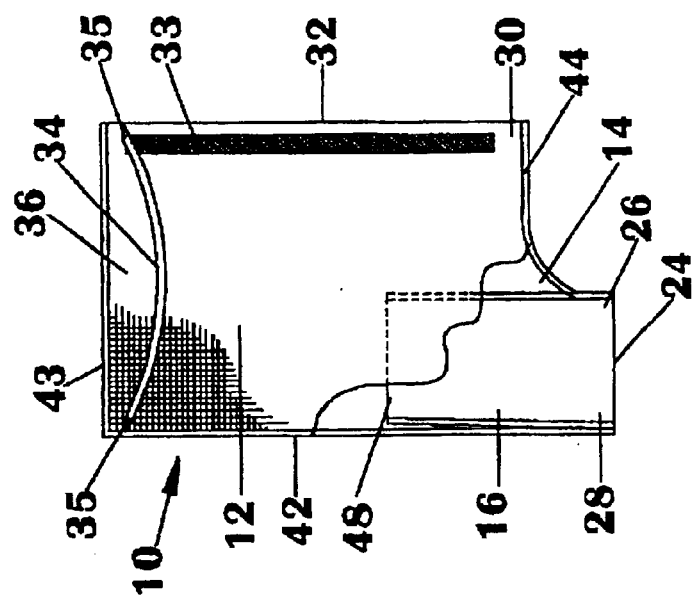
FIG. 3 is a side view an exemplary swimming pool pressure-cleaner bag according to the present invention showing the inflow tube as a turned-out extension and integral with the attachment portion of the bag.

As illustrated in FIG. 3, in a highly preferred embodiment of this invention, the wall 12, attachment portion 14, and inflow tube 16 are not separate members but integral. The bag 10 is thereby a unitary piece with no points or lines of separation between the wall 12, attachment portion 14, and inflow tube 16. The bag 10 is constructed from a single piece of porous material cut to the desired shape that is folded over at the second side edge 42 and then sewn together along the top edge 43 and the third side edge 44. Alternatively, the bag 10 is formed from two pieces of porous material sized to be of equivalent, conforming shape that are also sewn together at edges 43 and 44 as well as at the second side edge 42.

In this embodiment, the inflow tube 16 is a turned-out extension of the attachment portion 14. This portion of the bag 10 constituting the inflow tube 16 is then folded into itself up to the folding line 46 so that the tube distal edge 48 extends into and opens inside the cavity 18 as shown in FIG. 1. After the inflow tube 16 is folded inside the bag 10, the opening then formed at the folding line 46 becomes the inflow opening 24 where the attachment portion 14 is mounted onto the outflow port 22 of the swimming pool pressure cleaner 20.

The swimming pool pressure-cleaner bag 10 of this invention provides significant improvements in its operation and use over other debris bags. This is illustrated by FIGS. 4–7. The bag 10 is shown installed upon the outflow port 22 of a swimming pool pressure cleaner 20 (not shown). The inflow opening 24 (not shown) is placed over the port 22 and locked in position by mounting rings 50. Prior to use of the bag 10 for debris collection through activation of the swimming pool pressure cleaner 20, as shown in FIG. 4, the inflow tube 16 resides inside the cavity 18 of the bag 10 in a flaccid, collapsed state. The condition of the inflow tube 16 is such that it rests over the outflow port opening 52, blocking off the opening 52 so that there is little flow other than water into or out of the cavity 18.

As seen in FIG. 5, when the swimming pool pressure cleaner 20 is in operation, water and debris 25 are forced upward through the outflow port 22 into the bag 10 in the direction depicted by arrow 54. The pressure of this flow expands the inflow tube 16 so that it takes on the erect configuration illustrated. The symmetrical construction of the inflow tube 16 is such that, when erected, the tube takes on a cylindrical configuration. As a result, the flow across cross-sectional areas along its entire length approximates the cross-sectional flow area at the opening 52 of the outflow port 22. This aspect of the inflow tube 16 minimizes any restriction or diversion in the flow entering the bag 10.

Figure 6:
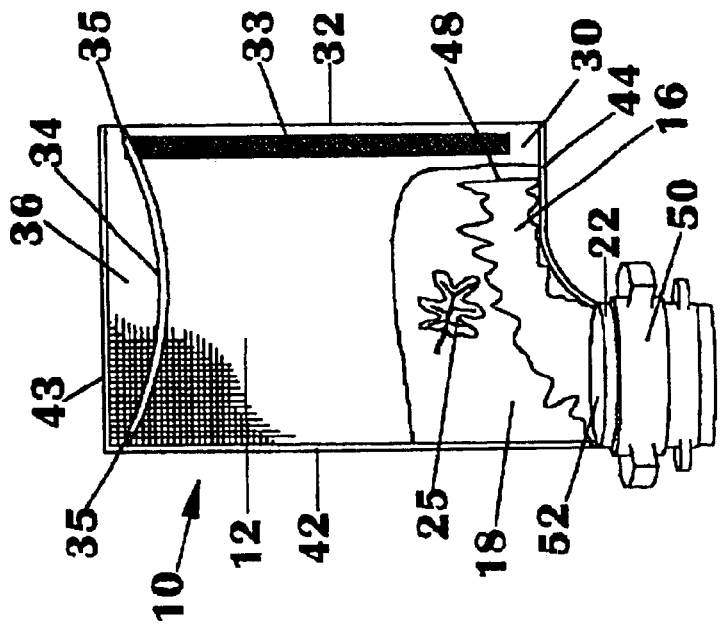
FIG. 6 is a side constructional view of the swimming pool pressure-cleaner bag of FIG. 5 including a partial cut-out showing the status of the inflow tube immediately after fluid pressure entering the bag from the outflow port stops.
Figure 7:
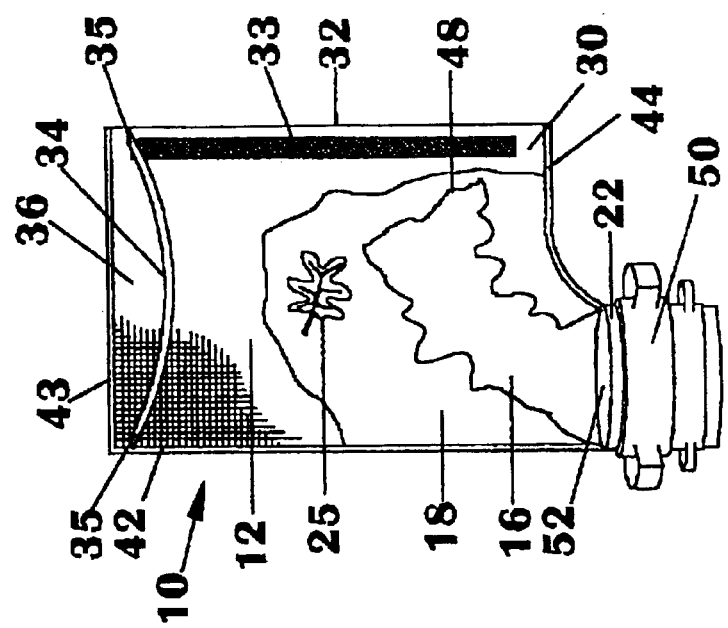
FIG. 7 is a side constructional view of the swimming pool pressure-cleaner bag of FIG. 6 including a partial cut-out showing the status of the inflow tube minutes after fluid pressure entering the bag from the outflow port has stopped.

As shown in FIG. 6, the inflow tube 16 collapses in upon itself when the swimming pool pressure cleaner 20 is turned off. From the loss of pressure due to the absence of flow entering the tube 16, the direction of this collapse is opposite to the direction of the flow and therefore in the direction of the outflow port 22 along a line parallel to the axis of the tube 16 in its cylindrical state. With each such collapse, the inflow tube 16 returns to being a flaccid mound of porous material and arrives there in a generally random fashion. Each collapse leaves the material comprising the inflow tube 16 covering the outflow port opening 52 so as to block the flow of any debris 25 out of the bag 10 and into the swimming pool pressure cleaner 20 as seen in FIG. 7.

While the principles of this invention have been described in connection with specific embodiments, it should be understood clearly that these descriptions are made only by way of example and are not intended to limit the scope of the invention.

What is claimed is:

1. In debris-capturing apparatus of the type including (a) a fluid-pervious wall forming a cavity, (b) an attachment portion that forms an inflow opening and has an annular lowermost edge, the attachment portion being attachable near its lowermost edge to the outflow port of a pressure-cleaner device, and (c) inside the cavity a collapsible inflow tube that is substantially opened by inflow of fluid but is otherwise closed to block reverse flow of debris through the outflow port, the improvement wherein:

the inflow tube has an annular proximal edge secured to the attachment portion at and around the annular lowermost edge thereof; and the inflow tube is of a material chosen such that the inflow tube is made substantially erect along a flow axis by inflow of fluid but otherwise collapses axially to block reverse flow of debris.

2. The debris-capturing apparatus of claim 1 wherein the erected inflow tube has cross-sectional flow areas along its entire length approximating the cross-sectional flow area of the outflow port of the pressure-cleaner device, thereby minimizing any outflow restriction.

3. The debris-capturing apparatus of claim 1 wherein the inflow tube is made of a fluid-pervious material.

4. The debris-capturing apparatus of claim 3 wherein the inflow tube is integrally formed with the attachment portion.

5. The debris-capturing apparatus of claim 4 wherein the fluid-pervious wall, the attachment portion and the inflow tube are all integrally formed and constitute a pressure-cleaner bag, the inflow tube being a turned-in extension of the attachment portion.

6. The debris-capturing apparatus of claim 5 wherein the erected inflow tube has cross-sectional flow areas along its entire length approximating the cross-sectional flow area of the outflow port of the pressure-cleaner device, thereby minimizing any outflow restriction.

7. The debris-capturing apparatus of claim 1 wherein:

the pressure-cleaner device is a swimming pool cleaner; and the fluid-pervious wall, the attachment portion and the inflow tube constitute a pressure-cleaner bag which is a unitary piece.

8. The debris-capturing apparatus of claim 7 wherein the erected inflow tube has cross-sectional flow areas along its entire length approximating the cross-sectional flow area of the outflow port of the pressure-cleaner device, thereby minimizing any outflow restriction.

9. The debris-capturing apparatus of claim 1 wherein:

the fluid-pervious wall has a top portion;

the pressure-cleaner device has an inflow port attached to a pressure hose; and a band with opposite ends is attached at its opposite ends to the top portion for securing the fluid-pervious wall with respect to the pressure hose to allow the fluid-pervious wall to remain substantially upright.

10. The debris-capturing apparatus of claim 9 wherein the band is a length of rope.

11. A swimming pool pressure-cleaner bag comprising:

a fluid-pervious wall forming a cavity;

an attachment portion that forms an inflow opening and has an annular lowermost edge, the attachment portion being attachable near its lowermost edge to the outflow port of a pressure-cleaner device; and an erectible-collapsible inflow tube portion inside the cavity, the inflow tube portion (a) having an annular proximal edge secured to the attachment portion at and around the annular lowermost edge thereof and a distal end free to move within the cavity and (b) being of a material chosen such that the inflow tube is made substantially erect along a flow axis by inflow of fluid but otherwise collapses axially to block reverse flow of debris.

12. The swimming pool pressure-cleaner bag of claim 11 wherein the pressure-cleaner bag is a unitary piece, the inflow tube portion being a turned-in extension of the attachment portion.

13. The swimming pool pressure-cleaner bag of claim 11 wherein the erected inflow tube portion has cross-sectional flow areas along its entire length approximating the cross-sectional flow area of the outflow port of the pressure-cleaner device, thereby minimizing any outflow restriction.

14. The swimming pool pressure-cleaner bag of claim 13 wherein the pressure-cleaner bag is a unitary piece, the inflow tube portion being a turned-in extension of the attachment portion.

15. The swimming pool pressure-cleaner bag of claim 11 wherein:
  the fluid-pervious wall has a top portion;
  the swimming pool pressure-cleaner device has an inflow port attached to a pressure hose; and
  a band with opposite ends is attached at its opposite ends to the top portion for securing the fluid-pervious wall with respect to the pressure hose to allow the fluid-pervious wall to remain substantially upright.

16. The swimming pool pressure-cleaner bag of claim 15 wherein the band is a length of rope.

17. In a swimming pool cleaner including a pressure-cleaner bag with (a) a fluid-pervious wall forming a cavity, (b) an attachment portion that forms an inflow opening and has an annular lowermost edge, the attachment portion being attachable near its lowermost edge to the outflow port of the pool cleaner, and (c) inside the cavity a collapsible inflow tube that is substantially erected by inflow of fluid but is otherwise collapsible to block reverse flow of debris through the outflow port, the improvement wherein:
  the inflow tube has an annular proximal edge secured to the attachment portion at and around the annular lowermost edge thereof; and
  the inflow tube is of a material chosen such that the inflow tube is made substantially erect along a flow axis by inflow of fluid but otherwise collapses axially to block reverse flow of debris.

18. The swimming pool cleaner of claim 17 wherein the erected inflow tube has cross-sectional flow areas along its entire length approximating the cross-sectional flow area of the outflow port.

19. The swimming pool cleaner of claim 17 wherein the inflow tube is integrally formed with the attachment portion, the inflow tube being a turned-in extension of the attachment portion.

20. The swimming pool cleaner of claim 19 wherein the erected inflow tube has cross-sectional flow areas along its entire length approximating the cross-sectional flow area of the outflow port.

\* \* \* \* \*